(12) United States Patent
Hoeltke et al.

(10) Patent No.: US 10,359,585 B2
(45) Date of Patent: Jul. 23, 2019

(54) DEVICE FOR COUPLING AND/OR DECOUPLING OPTICAL SIGNALS

(71) Applicant: SILICON LINE GMBH, Munich (DE)

(72) Inventors: Holger Hoeltke, Munich (DE); Martin Groepl, Sonthofen Oberallgaeu (DE)

(73) Assignee: SILICON LINE GMBH, Munich (DE)

( * ) Notice: Subject to any disclaimer, the term of this patent is extended or adjusted under 35 U.S.C. 154(b) by 0 days.

(21) Appl. No.: 15/082,718

(22) Filed: Mar. 28, 2016

(65) Prior Publication Data

US 2016/0209607 A1    Jul. 21, 2016

Related U.S. Application Data

(63) Continuation of application No. PCT/DE2014/200521, filed on Sep. 30, 2014.

(30) Foreign Application Priority Data

Sep. 30, 2013  (DE) .......................... 10 2013 110 836
Mar. 22, 2014  (DE) .......................... 10 2014 205 372

(51) Int. Cl.
*G02B 6/42*    (2006.01)

(52) U.S. Cl.
CPC ........... *G02B 6/423* (2013.01); *G02B 6/4202* (2013.01); *G02B 6/4255* (2013.01); *G02B 6/4292* (2013.01); *G02B 6/4295* (2013.01)

(58) Field of Classification Search
CPC .... G02B 6/423; G02B 6/4295; G02B 6/4292; G02B 6/4255; G02B 6/4202
See application file for complete search history.

(56) References Cited

U.S. PATENT DOCUMENTS 4,361,380 A * 11/1982 Marazzi ............... G02B 6/3833
                                                      285/13
4,750,803 A *  6/1988 Schmidt ............... G02B 6/3874
                                                      385/72
(Continued)

FOREIGN PATENT DOCUMENTS

DE    10 2012 005 618 A1    8/2013
JP       H04-001506 A       1/1992
(Continued)

OTHER PUBLICATIONS

International Search Report issued in PCT/DE2014/200521; dated Mar. 31, 2015.

*Primary Examiner* — Ryan A Lepisto
*Assistant Examiner* — Erin D Chiem
(74) *Attorney, Agent, or Firm* — Studebaker & Brackett PC

(57) ABSTRACT

In order to further develop a device (100a, 100b, 100c, 100d, 100e, 100f) for coupling optical signals into at least one waveguide (10), wherein the device (100a, 100b, 100c, 100d, 100e, 100f) comprises at least one electro-optical converter (28) which sends out the optical signals in the direction of the axis or of the core (12) of the waveguide (10), in such a way that active alignment of the waveguide (10) is not necessary, it is proposed that the electro-optical converter (28) is incorporated, in particular embedded, in at least one send-site optical subassembly (40), and that the send-site optical subassembly (40) comprises at least one guiding channel (46) for aligning the waveguide (10) with respect to the electro-optical converter (28), in particular relative to the output port or to the active surface (30) of the electro-optical converter (28).

(Continued)

The corresponding is true for a device (140*a*, 140*b*, 140*c*, 140*d*, 140*e*, 140*f*) for decoupling optical signals from at least one waveguide (10).

14 Claims, 9 Drawing Sheets

(56) References Cited

U.S. PATENT DOCUMENTS

| | | | | |
|---|---|---|---|---|
| 5,703,982 | A * | 12/1997 | Takizawa | G02B 6/3869 385/60 |
| 6,283,644 | B1 | 9/2001 | Gilliland et al. | |
| 6,419,401 | B1 * | 7/2002 | Taira | G02B 6/381 385/55 |
| 6,554,485 | B1 * | 4/2003 | Beatty | G02B 6/3849 385/70 |
| 8,764,316 | B1 * | 7/2014 | Barnette | G02B 6/3869 385/80 |
| 2013/0084043 | A1 | 4/2013 | Ertel et al. | |

FOREIGN PATENT DOCUMENTS

| | | |
|---|---|---|
| JP | 2001-021776 A | 1/2001 |
| JP | 2005-172989 A | 6/2005 |

* cited by examiner

Fig. 1 (= Stand der Technik = prior art)

Fig. 2 (= Stand der Technik = prior art)

Fig. 3 (= Stand der Technik = prior art)

Fig. 4 (= Stand der Technik = prior art)

DEVICE FOR COUPLING AND/OR DECOUPLING OPTICAL SIGNALS

CROSS-REFERENCE TO RELATED APPLICATIONS

This application is a continuation of international (WO) patent application no. PCT/DE2014/200521, filed Sep. 30, 2014, which claims the respective priority
of German (DE) patent application no. DE 10 2013 110 836.9, filed Sep. 30, 2013, and
of German (DE) patent application no. DE 10 201 4 205 372.2, filed Mar. 22, 2014, the contents of each being hereby incorporated herein by reference.

FIELD OF THE INVENTION

The present invention relates generally to the technical field of optical subassemblies (OSA). More specifically, the present invention relates to a device for coupling optical signals into at least one waveguide and to a complementary device for decoupling optical signals from at least one waveguide.

The present invention further relates to a method for producing such a device for coupling and decoupling optical signals into/from at least one waveguide.

BACKGROUND OF THE INVENTION

As optical converters, in particular as active optical converters, vertical cavity surface emitting lasers (VCSEL) or photodiodes (PD) send or receive optical signals essentially perpendicular to their surface.

Figure 1:
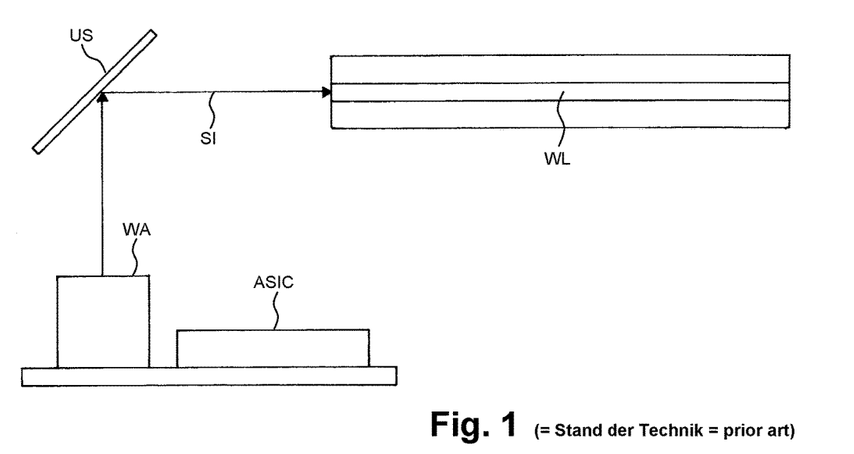
FIG. 1 a conceptual schematic view of a device according to the prior art, with which optical signals can be coupled at an angle of ninety degrees to the direction of emission.

In order to couple such optical signals SI into an optical waveguide WL or decouple them from an optical waveguide WL, the optical signals SI are to be deflected by a 45 degree deflection mirror US from the transmitting or receiving direction of the optical converter WA into a plane of the waveguide WL offset by ninety degrees, as may be taken from FIG. 1.

Publication DE 10 2012 005 618 A1 describes an active optical cable, whose fibers are materially bonded to an optical substrate. The fibers here become coupled with an integrated optical waveguide. A deflection element guides the free jet to the processing unit located on the substrate surface, wherein the free jet undergoes a directional change of ninety degrees, so as to direct the free jet into a transceiver unit.

Figure 2:
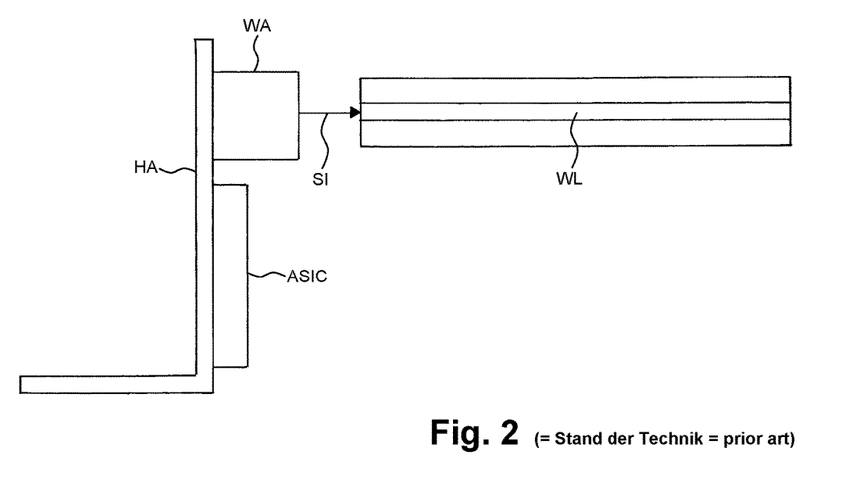
FIG. 2 a conceptual schematic view of a device according to the prior art, with which optical signals can be coupled in an axial direction to the waveguide by means of an L-bracket.
Figures 3, 4:
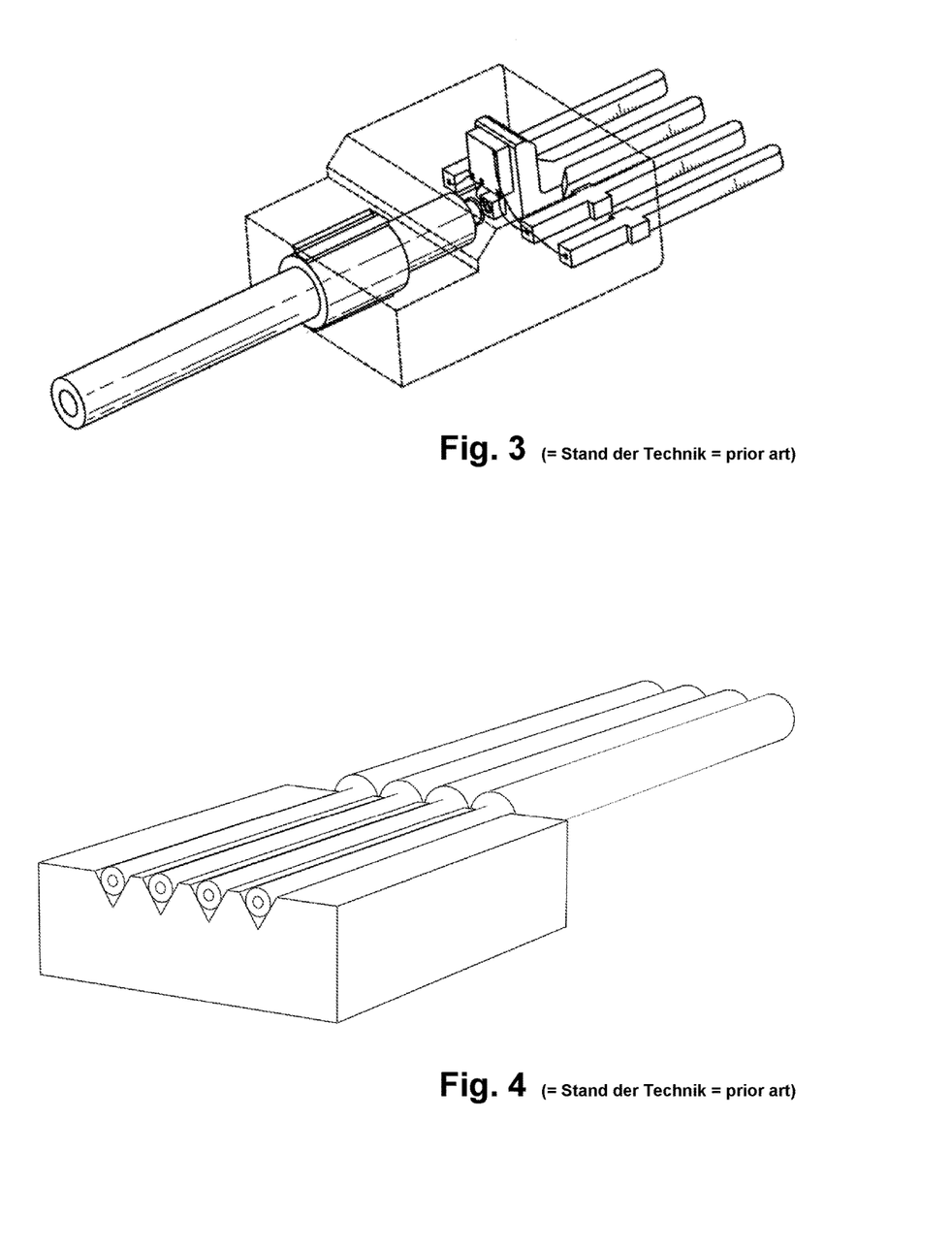
FIG. 3 a perspective view of an example for realizing a coupling or decoupling device according to the prior art, said device being provided for one waveguide.
FIG. 4 a perspective view of an example for realizing a coupling or decoupling device according to the prior art, said device being provided for four waveguides.

Alternatively, optical converters WA can be arranged by means of a corresponding bracket HA in such a way that their transmitting or receiving direction corresponds to the plane of the waveguide WL, as may be taken from FIG. 2 and FIG. 3.

The disadvantage to the solutions known from prior art consists in that the alignment of the optical axis between the waveguide (=the optical fibers) and the optical converter must be actively carried out repeatedly.

Alternatively to the active alignment of the optical fibers, the conventional option exists to align optical fibers with the (at least one) optical converter(s) using V-grooves (cf. FIG. 4).

The frame size of the known coupling and decoupling devices poses further difficulties. This frame size and structural design make the known solutions unsuitable for the realization of applications for home and mobile electronics. This implies longer connection paths between the components, and thus longer latency periods.

In addition, the manufacturing expenses for the solutions known from prior art are high and cost-intensive.

OBJECTS AND SUMMARY OF THE INVENTION

Starting from the above-explained disadvantages and shortcomings as well as taking the outlined prior art into account, the object of the present invention is to further develop a coupling device of the above-mentioned type and a decoupling device of the above-mentioned type in such a way that active alignment of the waveguide is not necessary; in addition, a corresponding miniaturization of the coupling and decoupling device is to be enabled at low optical losses, and at the same time, the manufacturing expenses are to be low.

This object is achieved by a coupling device according to the present invention with the herein described features and by a decoupling device according to the present invention with the herein described features, in particular by a miniaturized and modularized active optical transmitting unit and/or a miniaturized and modularized active optical receiving unit which are producible with a method according to the present invention with the herein described features. Advantageous embodiments and expedient further developments of the present invention are characterized in the respective dependent claims.

This object is achieved by a device for coupling optical signals into at least one waveguide, wherein the device comprises at least one electro-optical converter which sends out the optical signals in the direction of the axis or of the core of the waveguide,
wherein the electro-optical converter is incorporated, in particular embedded, in at least one send-site optical subassembly, and
wherein the send-site optical subassembly comprises at least one guiding channel for aligning the waveguide with respect to the electro-optical converter, in particular relative to the output port or to the active surface of the electro-optical converter.

This object is achieved by a device for decoupling optical signals from at least one waveguide, wherein the device comprises at least one opto-electrical converter which receives the optical signals from the direction of the axis or of the core of the waveguide,
wherein the receive-site optical subassembly comprises at least one guiding channel for aligning the waveguide with respect to the opto-electrical converter, in particular relative to the input port or to the active surface of the opto-electrical converter, and
wherein the opto-electrical converter is incorporated, in particular embedded, in at least one receive-site optical subassembly.

This object is further achieved by an embodiment according to the present invention wherein the optical subassembly is produced from at least one optically transparent or optically semi-transparent medium, in particular from at least one polymer.

This object is further achieved by an embodiment according to the present invention wherein the guiding channel is cylindrical or conical in shape.

This object is further achieved by an embodiment according to the present invention wherein the guiding channel is designed with graduations or multiple levels.

This object is further achieved by an embodiment according to the present invention wherein the guiding channel is tapered towards the converter.

This object is further achieved by an embodiment according to the present invention wherein the guiding channel is constructed such that the output/input port or active surface of the converter is positioned at a distance from the core of the waveguide.

This object is further achieved by an embodiment according to the present invention wherein the guiding channel is constructed closed or partially open with respect to its circumferential line.

This object is further achieved by an embodiment according to the present invention wherein at least one air outlet is provided, via which trapped and/or compressed air can be vented when the waveguide is inserted in the guiding channel.

This object is further achieved by an embodiment according to the present invention wherein the air outlet is arranged on the end of the guiding channel closest to the converter.

This object is further achieved by an embodiment according to the present invention
- wherein the air outlet is realized in the form of at least one passthrough created in the optical subassembly, in particular in the form of at least one drillhole made in the optical subassembly, and
- wherein the axial direction of the passthrough extends transversely, in particular substantially perpendicularly to the direction of the axis or core of the waveguide.

This object is further achieved by an embodiment according to the present invention wherein the air outlet
- is designed in the form of a groove or channel, and/or
- extends along the guiding channel, in particular over the entire length of the guiding channel.

This object is further achieved by an embodiment according to the present invention
- wherein the electro-optical converter is at least one laser, in particular at least one vertical cavity surface emitting laser (VCSEL), and/or
- wherein the opto-electrical converter is at least one diode, in particular at least one photodiode (PD).

The device according to the type presented hereinbefore may be produced by a three-dimensional micro-stereolithographic printing method according to the present invention.

The present invention finally relates to the use of at least one device according to the type presented hereinbefore and/or of the method according to the type presented hereinbefore for constructing at least one, in particular pluggable, active optical cable.

According to the present invention, electrical signals received via electrical terminal contacts can be processed in at least one circuit. The circuit, which can be designed as an application-specific (ASIC), for example as a custom chip, actuates at least one electro-optical converter, in particular at least one laser, for example at least one vertical cavity surface emitting laser (VCSEL).

This electro-optical converter is incorporated or integrated, in particular embedded, in at least one send-site optical subassembly (OSA), and axially transmits the converted optical signals to at least one waveguide, for example into at least one glass fiber.

The send-site optical subassembly has at least one guiding channel for aligning the waveguide with respect to the electro-optical converter, in particular relative to the output port or the active surface of the electro-optical converter.

The send-site optical subassembly enables a modular construction, and in particular the alignment and fixing of the waveguide relative to the electro-optical converter. This makes it possible for the dimensions of the send-site device according to the present invention to be reduced, and modularization is to be considered highly advantageous from the point of view of production and costs as well.

The send-site optical subassembly can be allocated to a substrate, which may function as a receiving medium for the send-site circuit and the send-site terminal contacts. The substrate may also be furnished with communication interfaces and electrical connections so as to enable communication between the individual components.

On the reception side, the incoming optical signals received via the waveguide are decoupled by at least one opto-electrical converter from the direction of the axis of the waveguide, in particular of the glass fibers.

This opto-electrical converter, which can be at least one diode, in particular at least one photodiode, is incorporated or integrated, in particular embedded, in at least one receive-site optical subassembly (OSA), and converts the optical signals into electrical signals.

The converted electrical signals may be output to at least one receive-site circuit, in particular to at least one application-specific integrated circuit (ASIC), for example to at least one custom chip.

The receive-site circuit processes, and if necessary amplifies the electrical signals and outputs them to receive-site terminal contacts.

The receive-site optical subassembly has at least one guiding channel for aligning the waveguide with the opto-electrical converter, in particular relative to the input port of the active surface of the opto-electrical converter.

The receive-site optical subassembly enables a modular construction, and in particular the alignment and fixing of the waveguide relative to the electro-optical converter. This makes it possible for the dimensions of the receive-site device according to the present invention to be reduced, and modularization is to be considered highly advantageous from the point of view of production and costs as well.

The receive-site optical subassembly can be allocated to a substrate, which may function as a receiving medium for the receive-site circuit and the receive-site terminal contacts. The substrate may also be furnished with communication interfaces and electrical connections so as to enable communication between the individual components.

According to the invention, therefore, an optical subassembly (OSA) is produced in a suitable manufacturing method in particular from at least one optically transparent or optically semi-transparent medium, for example from a polymer, and is conformed to both exclusively incorporate the one or more optical converters in preferably optically transparent material, and to ensure the precise, direct alignment of the optical axis of the optical converter with the optical axis of an optical fiber, without a ferrule, bare fiber or lens.

These requirements to be satisfied by the optical subassembly according to the present invention are achieved by the arrangement of the elements in the optical subassembly and by the conformation of the optical subassembly.

The manufacturing method according to the invention may be a three-dimensional micro-stereolithographic printing process, which embeds the optical converter in the preferably optically transparent material, for example an optically transparent polymer, during the printing process.

Besides embedding of the optical converters, arrangement of the elements and the precise conformation of the optically transparent material, the manufacturing method according to the present invention also enables metal contacting of the terminal contacts, for example the anode and the cathode, in each embedded optical converter.

In this way, it is possible to manufacture thousands of such subassemblies at the same time while they are arranged in a linear two-dimensional pattern, on a glass carrier, for example, thereby assuring an extremely favorable cost structure for said optical subassemblies.

According to a preferred embodiment of the present invention, the guiding channel may be cylindrical or conical in shape, wherein if it is tapered in the direction of the converter facilitates the introduction or insertion of the optical waveguide.

Independently thereof, or in conjunction therewith, the guiding channel may be designed with graduations or multiple levels, in which case the internal diameter of the guiding channel expediently becomes smaller in the direction of the converter in order to facilitate the introduction or insertion of the optical waveguide.

In an advantageous further development of the present invention, as a result of the conformation of the guiding channel the waveguide core can be seated directly on the outlet port or the active surface of the electro-optical converter, or on the inlet port or active surface of the electro-optical converter, or at a distance of just a few micrometers, perhaps twenty, above it.

According to a preferred embodiment of the present invention, the guiding channel may be closed or partially open with respect to its circumferential line. In the case of such a partial opening in this regard, trapped and/or compressed air may be vented through at least one air outlet when the waveguide is inserted in the guiding channel. In this way, poor optical coupling and therewith also optical losses between the converter and the optical fiber may be reliably avoided.

The air outlet may expediently be provided at the end of the guiding channel closest to the converter, for example in the form of at least one passthrough created in the optical subassembly, in particular in the form of at least one drillhole made in the optical subassembly, wherein the axial direction of the passthrough may extend transversely, in particular substantially perpendicularly to the direction of the waveguide axis or core.

Alternatively or in addition thereto, the air outlet may be designed in the form of a groove or channel, and/or may extend along the guiding channel, in particular over the entire length of the guiding channel.

According to an expedient variation of the present invention, the waveguide is aligned coaxially with a peripheral cable or peripheral contact that is fastenable to the terminal contacts in the plane of the substrate. This may be particularly significant for the attachment of optically active cables.

According to a preferred embodiment of the present invention, the device may comprise an enclosing housing, by which the device may be protected from external influences. This is particularly significant for use as an optically active cable, since the housing can then be used as a plug with a mechanism for connecting to peripheral devices.

Finally, the present invention relates to the embedding of at least one electro-optical converter, in particular at least one vertical cavity surface emitting laser (VCSEL), or at least one electro-optical converter, in particular or at least one photodiode (PD), in an optically transparent material, which may serve at the same time for mechanical guidance and alignment of at least one optical fiber relative to these optical converters.

The suggested device for coupling and decoupling optical signal may be described as an optical subassembly (OSA) or a mechanical seating, and can be used profitably in many application fields, primarily for the rapid transmission of signals between two components with electrical signal routing.

Accordingly, the present invention relates above all to the use thereof for attaching in particular pluggable active optical cables for rapid, low-loss signal conversion and data transmission in a very small installation space, to forward the electrically processed data quickly to the various units. The extremely short circuit paths within the device enable very short latency periods.

According to the invention, modularization enables an extremely high degree of automation during production. The separate assembly of the substrate with the ASIC and the optical subassembly with embedded electro-optical and/or opto-electrical converter, in particular with embedded electro-optical transmitter and/or with embedded opto-electrical receiver and hardwired fiber, means that the two components can also be processed further separately.

For example, the substrate with ASIC may be mounted and wave soldered onto a printed circuit board by machine in an automated "pick and place" process, while the optical subassembly can be forwarded to a later process step with the fiber, which is typically heat-sensitive.

The use of the invention as a pluggable active optical cable for the connection of peripheral devices is also conceivable, wherein processing of the electrical input and output signals, as well as conversion of the electrical signals into optical signals or of optical signals into electrical signals by electro-optical or opto-electrical converters, and the coupling of the optical signals into the waveguide, and decoupling therefrom is carried out in the plug ends of the cable.

Here, bidirectional cables may also be made available, particularly if the transmitting and receiving components are integrated in one accommodation/aligning module, or omnidirectional cables if the electro-optical converter is also an opto-electrical converter.

Moreover, this device also enables a novel assembly of a miniaturized electro-optical transmitter and/or a miniaturized opto-electrical receiver with an optical waveguide hardwired to the optical subassembly (OSA) to be created for transmitting electrical signals via such an optical waveguide.

The present invention particularly features a high degree of miniaturization, which is attributable to the inventive nature of the positioning, modularization and integration of the components. This in turn enables assembly with an active optical cable (AOC) with at least one miniaturized optical subassembly (OSA) of such kind.

The construction of such an extremely small, miniaturized optical subassembly in turn enables construction of a miniaturized electro-optical transmitter or a miniaturized opto-electrical receiver, each with connected optical waveguide or connected optical fiber, wherein the optical fiber that is connected to the optical subassembly is guided and aligned by said optical subassembly, in particular by the guiding channel provided in the optical subassembly.

The direct integration of the waveguide in the optical subassembly, in particular through the use of transparent media for manufacturing the optical subassembly, makes it possible to achieve very short signal connection lengths, bond wire lengths, for example, which helps to improve the received signal quality and reduces latency periods particularly with very high data transmission rates.

The modularization according to the present invention also provides opportunities to make substantial cost savings in production, for example by enabling a higher degree of automation.

BRIEF EXPLANATION OF THE DRAWINGS

As already discussed hereinbefore, there are various possibilities for embodying and further developing the teaching of the present invention in an advantageous manner. To this end, on the one hand reference is made to the explanations above and to the dependent claims, and on the other hand further embodiments, features and advantages of the present invention are explained in greater detail hereinafter, inter alia based upon the six exemplary embodiments illustrated by FIG. 5A to FIG. 10.

It is shown in.

Like or similar embodiments, elements or features are provided with identical reference numerals in FIG. 5A to FIG. 10. While no graphic distinction is made between the transmission side and the reception side, the receive-site elements corresponding to the send-site elements have a reference numeral that is higher by 40.

DETAILED DESCRIPTION OF THE INVENTION

In order to avoid unnecessary repetitions, the explanations below relate to all six of the exemplary embodiments of the present invention illustrated on FIG. 5A to FIG. 10 with respect to the configurations, features and advantages of the present invention, unless otherwise indicated:

The send-site layouts on FIG. 5A to FIG. 10 present respectively a device 100a, 100b, 100c, 100d 100e, 100f for coupling optical signals into a waveguide 10. The device 100a, 100b, 100c, 100d 100e, 100f has a send-site circuit (not shown), which based on incoming signals from send-site terminal contacts 22 actuates an electro-optical converter 28, which sends out the optical signals in the direction of the axis 12 of the waveguide 10.

The receive-site layouts on FIG. 5A to FIG. 10 present respectively a device 140a, 140b, 140c, 140d 140e, 140f for decoupling optical signals from at least one waveguide 10 in an opto-electrical converter 68, which receives the optical signals from the direction of the axis 12 of the waveguide 10, and transmits them as electrical signals to a receive-site circuit (not shown), which processes the incoming electrical signals and outputs them to receive-site terminal contacts.

Figure 5A:
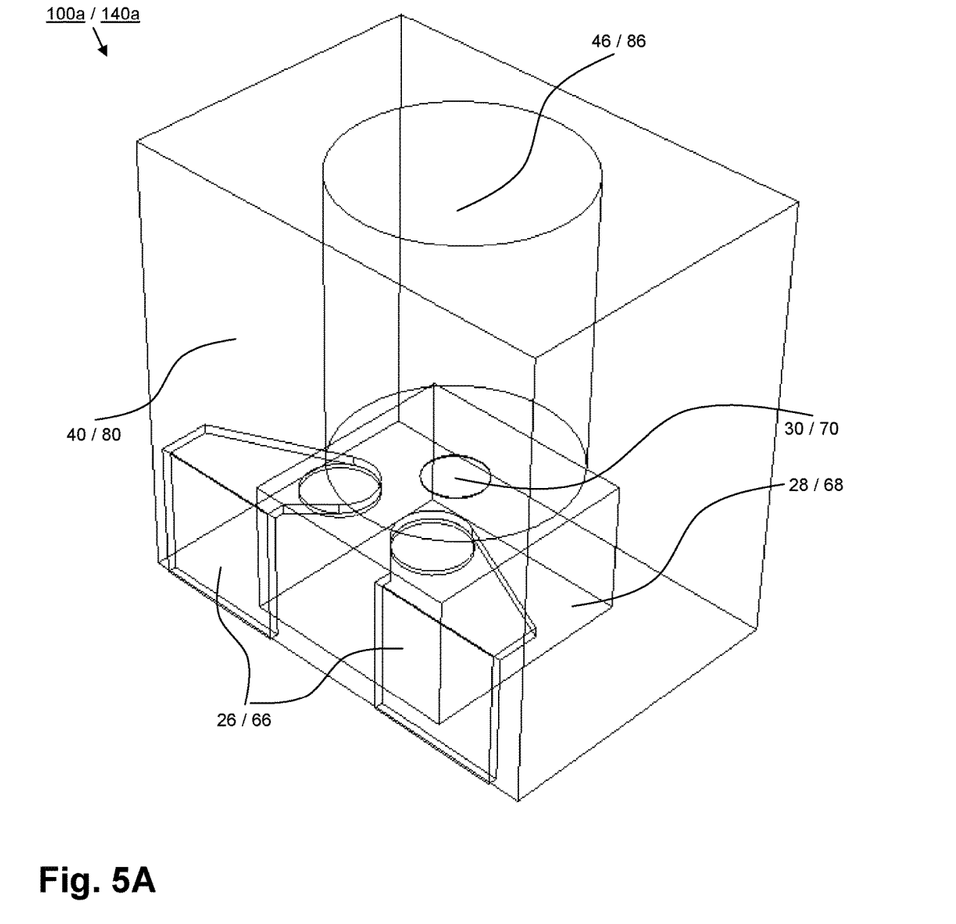
FIG. 5A a perspective view of a first exemplary embodiment for a device according to the present invention, said device being manufactured according to the method of the present invention.
Figure 5B:
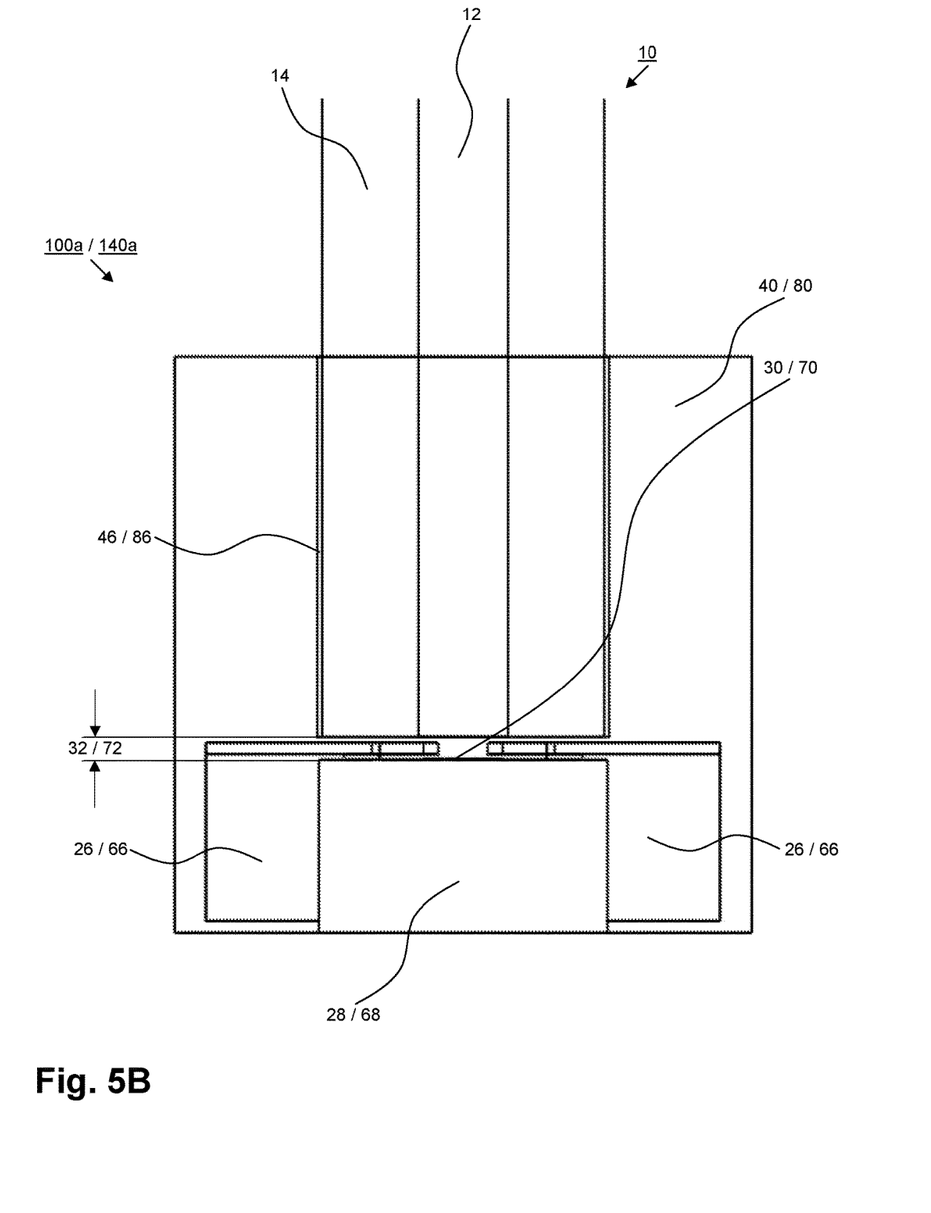
FIG. 5B a side view of the device of FIG. 5A with the waveguide inserted in the guiding channel.
Figure 6:
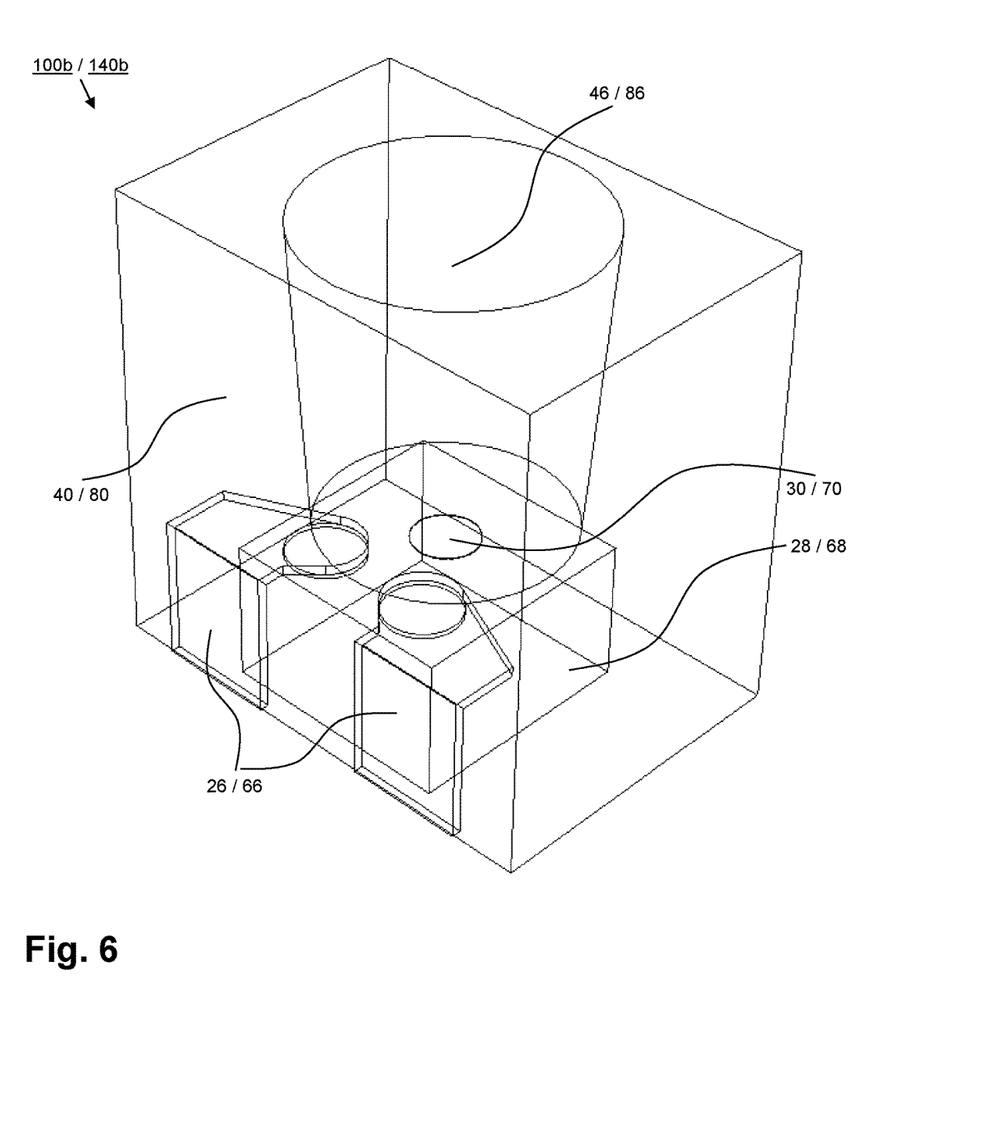
FIG. 6 a perspective view of a second exemplary embodiment for a device according to the present invention, said device being manufactured according to the method of the present invention.

According to the invention, the arrangement of the elements in an optical subassembly manufactured from transparent polymer or in an optical subassembly 40 and 80 is configured in such a way that the core surface 12 of the optical fiber 10 is seated directly on the outlet port 30 of the laser 28 and on the active surface 70 of the photodiode 68, or at a distance 32 of just a few micrometers, perhaps twenty, above it (cf. first embodiment according to FIG. 5A and FIG. 5B).

The arrangement of the elements in the optical subassembly 40 or 80 does not require a deflection mirror or lens
  to align the optical signal from the output port 30 of the
    laser 28 into the optical fiber 10 or
  to align the optical signal from the optical fiber 10 with
    the active surface 70 of the photodiode 68.

The arrangement of metal contacts is advantageously carried out in such a way that on the one hand they contact the terminal contacts 26 or 66 of the embedded optical converter 28 or 68, which contacts are particularly realized as metal pressure contacts or sliding contacts, and on the other, emerging from the material of the optical subassembly 40 or 80, are incident on a lateral surface of the outside of the optical subassembly 40 or 80 offset by ninety degrees with respect to the terminal contacts 26 or 66 of the optical converter 28 or 68 (cf. FIG. 5A and FIG. 5B).

The optical subassembly 40 or 80 is conformed such that the optical fiber 10 and core 12, together with the optical sheathing 14 (cf. FIG. 5B) that completely surrounds the optical core 12 is aligned with output port 30 of the electro-optical converter 28 and the active surface 70 of the opto-electrical converter 68 in a precisely fitting cylindrical fiber guiding channel 46 or 86 of the optical subassembly 40 or 80.

In this context, particularly the optical core 12 of the optical fiber 10 may be aligned centrally over the output port 30 of the electro-optical converter 28 or centrally over the active surface 70 of the opto-electrical converter 68 (cf. FIG. 5A and FIG. 5B).

In addition, the conformation of the optical subassembly 40 or 80 enables the core surface 12 of the optical fiber 10 to be seated directly on the outlet port 30 of the laser 28 and on the active surface 70 of the photodiode 68, or at a distance 32 of just a few micrometers, perhaps twenty, above it (cf. first embodiment according to FIG. 5A and FIG. 5B).

The abovementioned technical features enable the realization of an optical subassembly 40 or 80 with a volume of less than one cubic millimeter.

Figure 7:
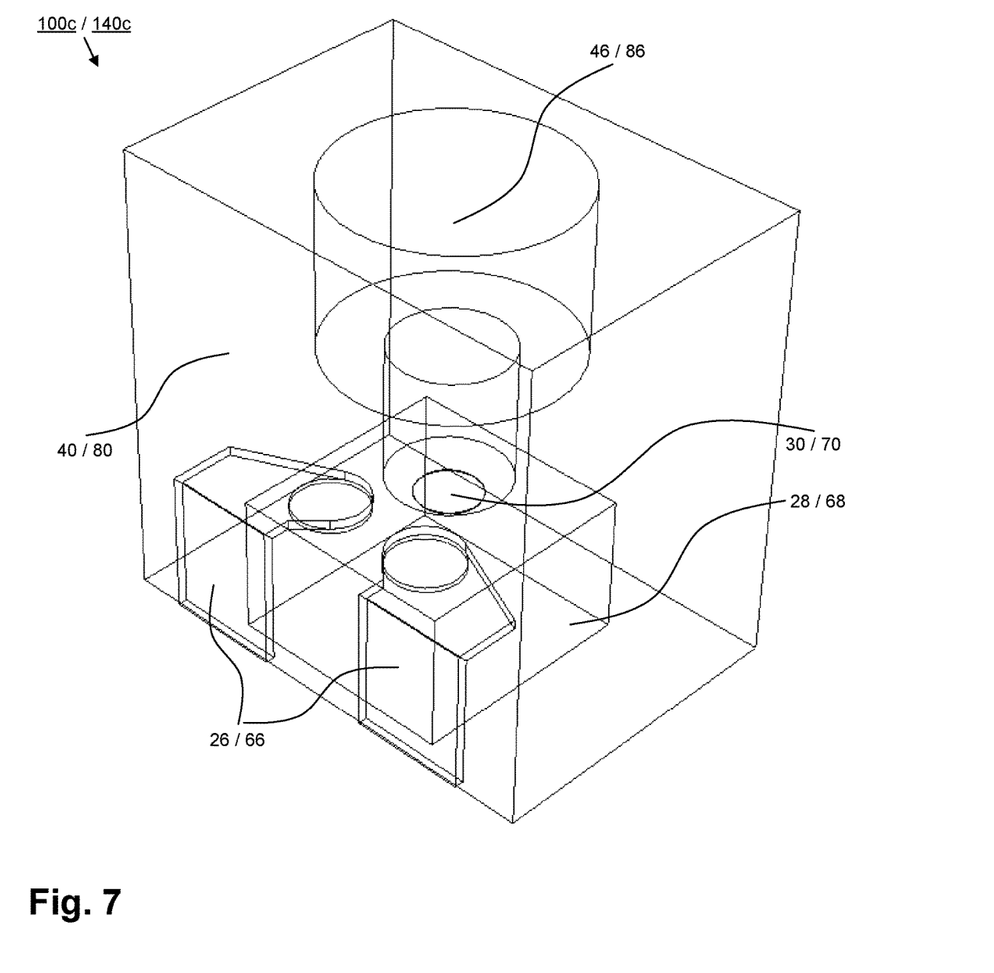
FIG. 7 a perspective view of a third exemplary embodiment for a device according to the present invention, said device being manufactured according to the method of the present invention.
Figure 8:
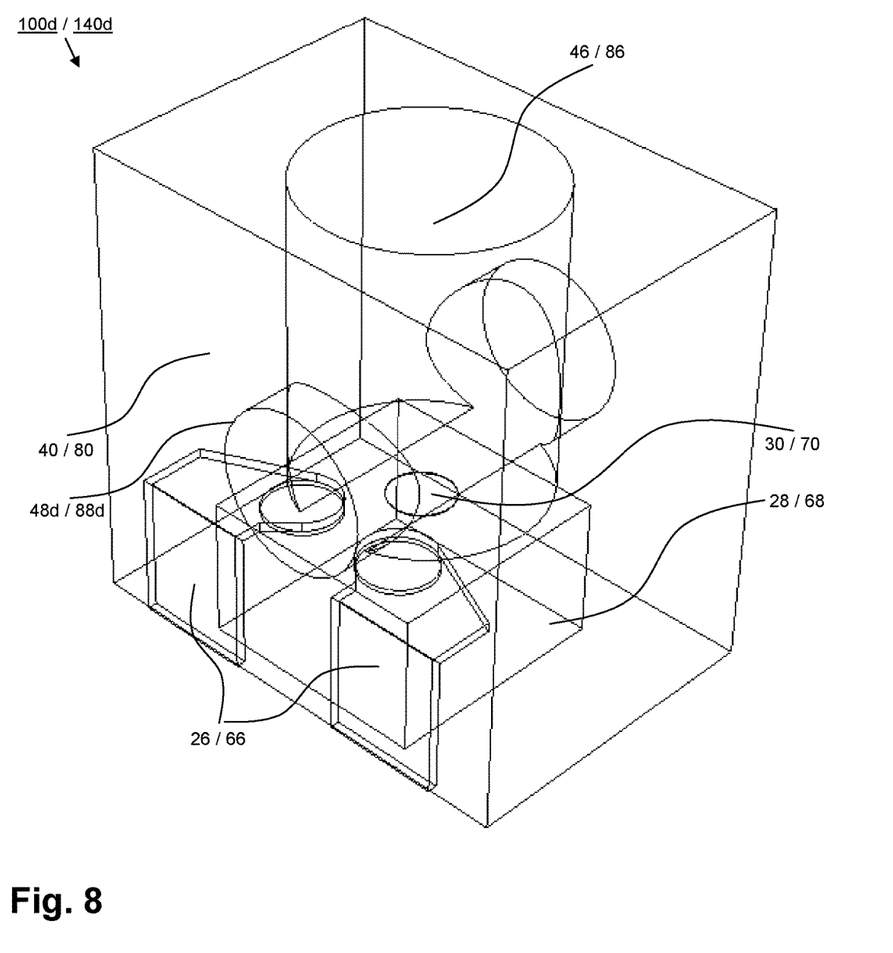
FIG. 8 a perspective view of a fourth exemplary embodiment for a device according to the present invention, said device being manufactured according to the method of the present invention.
Figure 9:
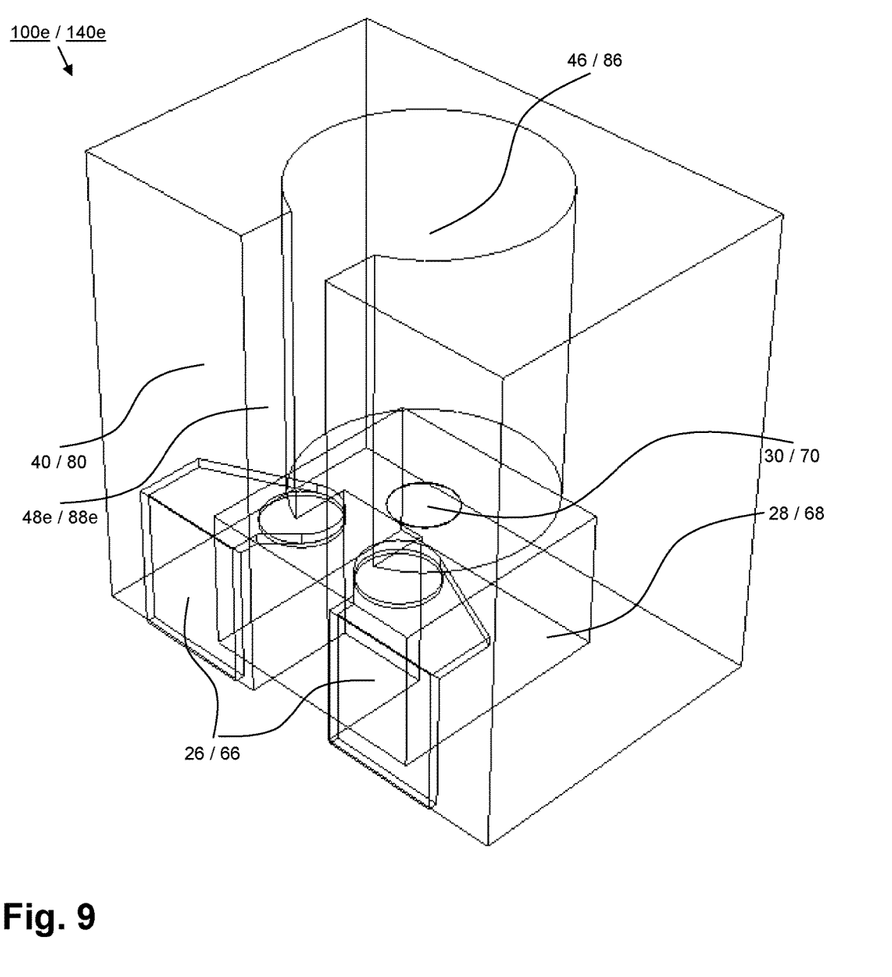
FIG. 9 a perspective view of a fifth exemplary embodiment for a device according to the present invention, said device being manufactured according to the method of the present invention.
Figure 10:
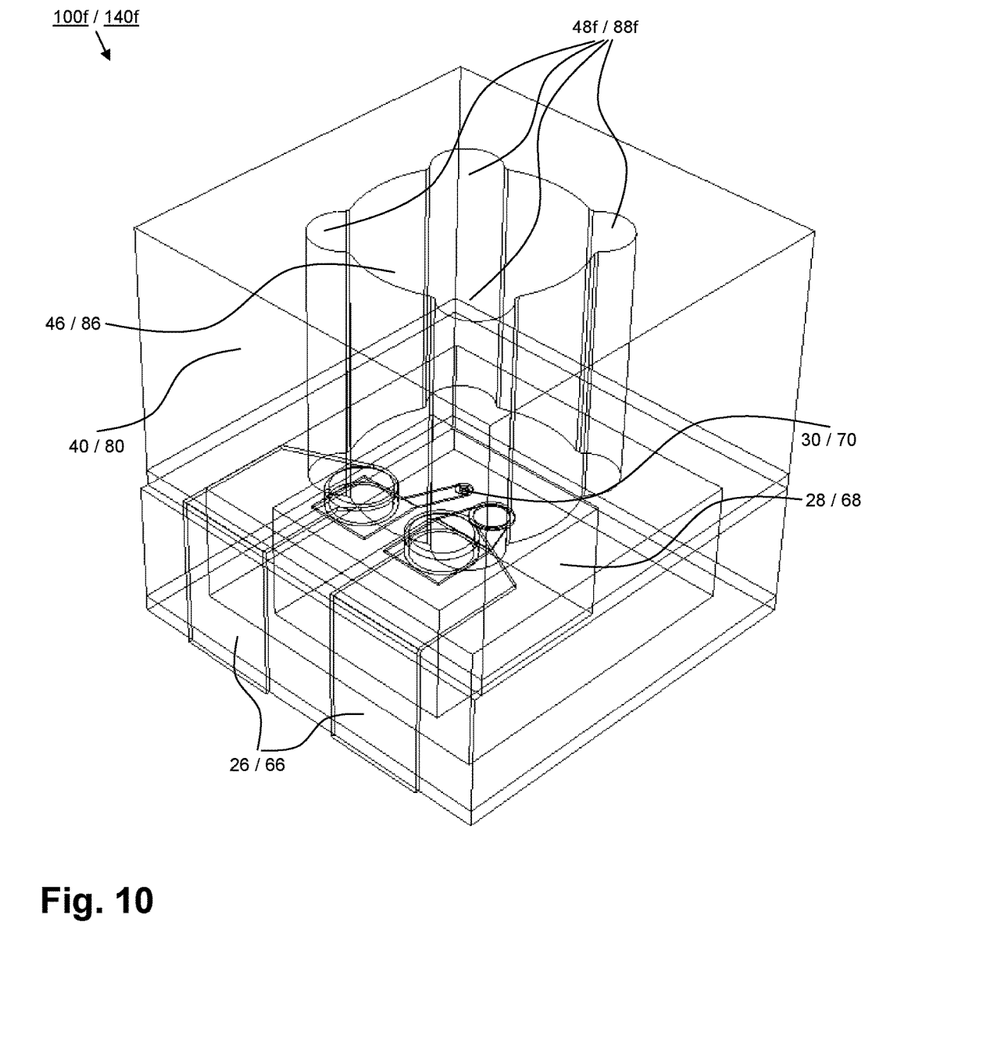
FIG. 10 a perspective view of a sixth exemplary embodiment for a device according to the present invention, said device being manufactured according to the method of the present invention.

In further exemplary embodiments of the present invention, in order to enable the optical fiber 10 to be inserted more quickly and easily, the (fiber) guiding channel 46 or 86 in optical subassembly 40 or 80 may also be tapered conically towards the converter 28 or 68 (cf. second embodiment according to FIG. 6) or graduated, particularly with at least two different cylindrical internal diameters (cf. third embodiment according to FIG. 7).

Since it can happen that air becomes trapped and compressed when the optical fiber 10 is inserted, particularly in the non-conical guiding channel 46 or 86, poor optical coupling and consequently optical losses can occur between the optical converter 28 or 68 and the optical fiber 10.

For this reason, additionally
- at least one air outlet 48d or 88d arranged for example laterally on the end of the guiding channel 46 or 86 closest to the converter 28 or 68 in the optical subassembly 40 or 80, wherein the axial direction of the air outlet 48d or 88d extends transversely, in particular substantially perpendicularly to the direction of the axis or core 12 of the waveguide 10 (cf. fourth embodiment according to FIG. 8),
- at least one air outlet groove 48e or 88e arranged laterally or on the side, and particularly extending over the entire length of the optical subassembly 40 or 80, for example over the entire length of the guiding channel 46 or 86 (cf. fifth embodiment according to FIG. 9) or
- at least one air outlet channel 48f or 88f, particularly extending over the entire length of the optical subassembly 40 or 80, for example over the entire length of the guiding channel 46 or 86, wherein the air outlet channels 48f or 88f, of which four air outlet channels 48f or 88f are shown for exemplary purposes, may be arranged equidistantly and symmetrically about the cylindrical guiding channel 46 or 86 (cf. sixth embodiment according to FIG. 10), may be provided to ensure even, reliable and complete venting of any air that becomes trapped and compressed when waveguide 10 is inserted in guiding channel 46 or 86.

LIST OF REFERENCE NUMERALS 10 waveguide, particularly optical fiber
12 axial direction of the waveguide 10, particularly optical fiber core
14 optical sheathing, of the waveguide 10
26 electrical contacting for electro-optical converter 28, in particular incident on a lateral surface of the send-site optical subassembly 40
28 electro-optical converter, in particular active optical transmission unit, for example laser, such as vertical cavity surface emitting laser (VCSEL)
30 output port or active surface of the electro-optical converter 28
32 distance between output port or active surface of the electro-optical converter 28 and core surface of the core of waveguide 10
40 send-site optical subassembly
46 send-site guiding channel
48d air outlet, particularly passthrough in the optical subassembly 40, for example a drillhole on the end of guiding channel 46 closest to the converter 28 extending transversely, or substantially perpendicularly to the direction or axis of the core 12 of waveguide 10 (=fourth exemplary embodiment; cf. FIG. 8)
48e air outlet, particularly air outlet groove or groove-like air outlet (=fifth exemplary embodiment; cf. FIG. 9)
48f air outlet, particularly air outlet channel or channel-like air outlet (=sixth exemplary embodiment; cf. FIG. 10)
66 electrical contacting for opto-electrical converter 68, in particular incident on a lateral surface of the receive-site optical subassembly 80
68 opto-electrical converter, in particular active optical reception unit, for example diode, such as a photodiode (PD)
70 input port or active surface of the opto-electrical converter 68
72 distance between core 12 of waveguide 10 and input port or active surface 70 of the opto-electrical converter 68
80 receive-site optical subassembly
86 receive-site guiding channel
88d air outlet, particularly passthrough in the optical subassembly 80, for example a drillhole on the end of guiding channel 86 closest to the converter 68 extending transversely, or substantially perpendicularly to the direction or axis of the core 12 of waveguide 10 (=fourth exemplary embodiment; cf. FIG. 8)
88e air outlet, particularly air outlet groove or groove-like air outlet (=fifth exemplary embodiment; cf. FIG. 9)
88f air outlet, particularly air outlet channel or channel-like air outlet (=sixth exemplary embodiment; cf. FIG. 10)
100a send-site device (=first exemplary embodiment; cf. FIG. 5A and FIG. 5B)
100b send-site device (=second exemplary embodiment; cf. FIG. 6)
100c send-site device (=third exemplary embodiment; cf. FIG. 7)
100d send-site device (=fourth exemplary embodiment; cf. FIG. 8)
100e send-site device (=fifth exemplary embodiment; cf. FIG. 9)
100f send-site device (=sixth exemplary embodiment; cf. FIG. 10)
140a receive-site device (=first exemplary embodiment; cf. FIG. 5A and FIG. 5B)
140b receive-site device (=second exemplary embodiment; cf. FIG. 6)
140c receive-site device (=third exemplary embodiment; cf. FIG. 7)
140d receive-site device (=fourth exemplary embodiment; cf. FIG. 8)
140e receive-site device (=fifth exemplary embodiment; cf. FIG. 9)
140f receive-site device (=sixth exemplary embodiment; cf. FIG. 10) ASIC circuit, in particular application-specific integrated circuit (ASIC), for example custom chip (=prior art; cf. FIG. 1 and FIG. 2)
HA bracket (=prior art; cf. FIG. 2)
SI optical signal (=prior art; cf. FIG. 1 and FIG. 2)
US deflection mirror (=prior art; cf. FIG. 1)
WA optical converter (=prior art; cf. FIG. 1 and FIG. 2)
WL optical waveguide (=prior art; cf. FIG. 1 and FIG. 2)

While this invention has been described as having a preferred design, it is understood that it is capable of further modifications, and uses and/or adaptations of the invention and following in general the principle of the invention and including such departures from the present disclosure as come within the known or customary practice in the art to which the invention pertains, and as may be applied to the central features hereinbefore set forth, and fall within the scope of the invention.

What is claimed is:

1. A device for coupling optical signals into at least one waveguide, wherein the device comprises at least one electro-optical converter which sends out the optical signals in the direction of the axis or of the core of the waveguide,
  wherein the electro-optical converter is incorporated in at least one send-site optical subassembly,
  wherein the send-site optical subassembly comprises at least one guiding channel for aligning the waveguide with respect to the electro-optical converter, and
  wherein at least one air outlet is provided, via which trapped and/or compressed air can be vented when the waveguide is inserted in the guiding channel, with the air outlet designed in the form of a groove extending along the entire length of the guiding channel, with the send-site optical subassembly being broken through by the air outlet, said air outlet having the form of a recess from the guiding channel surface to the outer surface of the send-site optical subassembly.

2. The device according to claim 1, wherein the guiding channel
  is cylindrical or conical in shape, or
  is designed with graduations or multiple levels, or
  is tapered towards the converter.

3. The device according to claim 1, wherein the guiding channel
  is constructed such that the output/input port or active surface of the converter is positioned at a distance from the core of the waveguide, or
  is constructed closed or partially open with respect to its circumferential line.

4. The device according to claim 1, wherein the air outlet is arranged on the end of the guiding channel closest to the converter.

5. The device according to claim 1, wherein the electro-optical converter is at least one laser.

6. A three-dimensional micro-stereolithographic printing method for producing at least one device according to claim 1.

7. The device according to claim 1, wherein the optical subassembly is produced from at least one optically transparent or optically semi-transparent medium.

8. A device for decoupling optical signals from at least one waveguide, wherein the device comprises at least one opto-electrical converter which receives the optical signals from the direction of the axis or of the core of the waveguide,
  wherein the receive-site optical subassembly comprises at least one guiding channel for aligning the waveguide with respect to the opto-electrical converter,
  wherein the opto-electrical converter is incorporated in at least one receive-site optical subassembly, and
  wherein at least one air outlet is provided, via which trapped and/or compressed air can be vented when the waveguide is inserted in the guiding channel, with the air outlet designed in the form of a groove extending along the entire length of the guiding channel, with the receive-site optical subassembly being broken through by the air outlet, said air outlet having the form of a recess from the guiding channel surface to the outer surface of the receive-site optical subassembly.

9. The device according to claim 8, wherein the guiding channel
  is cylindrical or conical in shape, or
  is designed with graduations or multiple levels, or
  is tapered towards the converter.

10. The device according to claim 8, wherein the guiding channel
  is constructed such that the output/input port or active surface of the converter is positioned at a distance from the core of the waveguide, or
  is constructed closed or partially open with respect to its circumferential line.

11. The device according to claim 8, wherein the air outlet is arranged on the end of the guiding channel closest to the converter.

12. The device according to claim 8, wherein the opto-electrical converter is at least one diode.

13. A three-dimensional micro-stereolithographic printing method for producing at least one device according to claim 8.

14. The device according to claim 8, wherein the optical subassembly is produced from at least one optically transparent or optically semi-transparent medium.

* * * * *